(12) United States Patent
Pieper et al.

(10) Patent No.: US 10,341,308 B2
(45) Date of Patent: *Jul. 2, 2019

(54) METHOD FOR TRANSMITTING INFORMATION FROM A FIRST INFORMATION PROVIDER TO A SECOND INFORMATION PROVIDER VIA AN INFORMATION INTERMEDIARY

(71) Applicant: Proximic, LLC, Reston, VA (US)

(72) Inventors: Philipp Pieper, Palo Alto, CA (US); Rodney Mayers, San Mateo, CA (US)

(73) Assignee: Proximic, LLC., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/980,703

(22) Filed: May 15, 2018

(65) Prior Publication Data

US 2018/0270207 A1  Sep. 20, 2018

Related U.S. Application Data

(63) Continuation of application No. 13/866,094, filed on Apr. 19, 2013, now Pat. No. 9,998,429, which is a
(Continued)

(51) Int. Cl.
*H04L 29/06* (2006.01)
*H04L 29/08* (2006.01)
*G06Q 30/02* (2012.01)

(52) U.S. Cl.
CPC ..... *H04L 63/0428* (2013.01); *G06Q 30/0241* (2013.01); *H04L 29/08* (2013.01);
(Continued)

(58) Field of Classification Search
CPC .................................................. H04L 63/0428
See application file for complete search history.

(56) References Cited

U.S. PATENT DOCUMENTS

| 6,633,850 B1 | 10/2003 | Gabbard et al. |
| 7,761,501 B1 | 7/2010 | O'Toole, Jr. |

(Continued)

FOREIGN PATENT DOCUMENTS

WO  2012/057796 A1  5/2012

OTHER PUBLICATIONS

WIPO, International Preliminary Report on Patentability issued in International Application No. PCT/US2010/054792 dated Apr. 30, 2013.

(Continued)

*Primary Examiner* — Simon P Kanaan
(74) *Attorney, Agent, or Firm* — Baker & Hostetler LLP

(57) ABSTRACT

Various method for transmitting information from a first information provider to a second information provider via an information intermediary are disclosed. At a first point in time and at the information intermediary, first information from the first information provider is received. A plurality of different types of data regarding the first information are generated. The plurality of different types of data regarding the first information are associated with a unique identifier of the first information. At a second point in time and at the information intermediary, a token comprising the unique identifier of the first information and an identifier of the type of data regarding the first information is received. The data regarding the first information of the type indicated in the token is retrieved. At least part of the data regarding the first information of the type indicated in the token is transmitted to the second information provider.

20 Claims, 1 Drawing Sheet

| 100 | 200 | 300 | 400 |
|---|---|---|---|
|  | 201 |  |  |
| 102 | 202 |  |  |
| 103 |  |  |  |
| 104 | 204 |  |  |
| 105 | 205 |  |  |
|  | 206 |  |  |
| 107 |  |  |  |
| 108 |  |  |  |
| 109 |  | 309 |  |
|  |  | 310 | 410 |
|  | 211 |  | 411 |
|  | 212 |  |  |
|  | 213 |  |  |
|  | 214 |  | 414 |

Related U.S. Application Data continuation-in-part of application No. PCT/US2010/054792, filed on Oct. 29, 2010.

(52) U.S. Cl.
CPC ........ *H04L 63/045* (2013.01); *H04L 63/0442* (2013.01); *H04L 67/02* (2013.01); *H04L 67/20* (2013.01)

(56) References Cited

U.S. PATENT DOCUMENTS

| | | |
|---|---|---|
| 8,676,900 B2 | 3/2014 | Yruski et al. |
| 8,825,472 B2 | 9/2014 | Raghuveer |
| 9,652,769 B1 | 5/2017 | Golin |
| 2006/0287920 A1 | 12/2006 | Perkins et al. |
| 2007/0033637 A1 | 2/2007 | Yami et al. |
| 2007/0088821 A1 | 4/2007 | Sankuratripati et al. |
| 2008/0065759 A1 | 3/2008 | Gassewitz et al. |
| 2008/0243702 A1 | 10/2008 | Hart et al. |
| 2008/0275873 A1 | 11/2008 | Bosarge et al. |
| 2009/0024718 A1 | 1/2009 | Anagnostopoulos et al. |
| 2009/0228967 A1 | 9/2009 | Gbadegesin et al. |
| 2010/0146115 A1 | 6/2010 | Bezos |
| 2010/0161411 A1 | 6/2010 | Wu et al. |
| 2011/0023096 A1 | 1/2011 | Xiao et al. |
| 2011/0093609 A1 | 4/2011 | Blom et al. |
| 2011/0258461 A1 | 10/2011 | Bates |
| 2012/0045002 A1 | 2/2012 | Zivkovic |
| 2012/0166520 A1 | 6/2012 | Lindsay et al. |
| 2013/0018906 A1 | 1/2013 | Nigam et al. |
| 2013/0031643 A1 | 1/2013 | Rogel et al. |
| 2013/0238890 A1 | 9/2013 | Pieper |
| 2013/0254334 A1 | 9/2013 | Pieper |

OTHER PUBLICATIONS

Whitfield Diffie et al: New Directions in Cryptography, IEEE Transactions on Information Theory, vol. 22, No. 6, Nov. 1976, pp. 644-654.

Truman, Thomas E., Trevor Pering, Roger Doering, and Robert W. Brodersen. "The InfoPad multimedia terminal: A portable device for wireless information access." Computers, IEEE Transactions on 47, No. 10 (1998): 1073-1087.

Hacigumus, Hakan, Bala Iyer, Chen Li, and Sharad Mehrotra. "Executing SQL over encrypted data in the database-service-provider model." In Proceedings of the 2002 ACM SIGMOD international conference on Management of data, pp. 216-227. ACM, 2002.

METHOD FOR TRANSMITTING INFORMATION FROM A FIRST INFORMATION PROVIDER TO A SECOND INFORMATION PROVIDER VIA AN INFORMATION INTERMEDIARY

CROSS REFERENCE TO RELATED APPLICATIONS

This application is a continuation of U.S. patent application Ser. No. 13/866,094, filed Apr. 19, 2013, and published as U.S. Patent App. Pub. No. 2013/0238890 on Sep. 12, 2013, which is a continuation-in-part of International Patent App. No. PCT/US2010/054792, filed Oct. 29, 2010, the entire disclosures of which are incorporated by reference herein.

FIELD OF THE INVENTION

The present invention essentially relates to information transmittal in the Internet.

BACKGROUND OF THE INVENTION

Even though the invention is partly described in relation with banner advertisement, the invention is not limited to this field. Rather, the invention can help to improve and control information transmittal between different parties in various fields. E.g., members who contribute to providing their personal information on social networks also want to have control over the dissemination of that information which is required from third parties and need to be transmitted to those third parties.

Conventional banner advertisement in the Internet uses so-called inline frames (iframes) as placeholders. The publisher (also referred to as first information provider below) who publishes content (also referred to as first information below) on a web page which is visited by Internet users defines advertising space on his web page using a (first) iframe. This (first) iframe is linked to an advertiser (also referred to as second information provider below), either directly or indirectly, e.g. by a so-called ad-server (also referred to as chooser below) or other advertising agents. If it is linked directly, the iframe source is the banner ad from the advertiser. If it is linked indirectly, the first iframe source is a second iframe hosted by the ad-server leading to so-called nested iframes. The ad-server is associated with a number of advertisers and other advertisement agents and usually loads the second iframe source with content containing a banner ad of one of these advertisers in real-time. There are various methods already known in the art of online ad serving as to how the ad-server chooses one of the associated advertisers.

Thus, in both cases, the first information and the second information will, in the end, appear together for a visitor of the first information provider's web page.

The technical reason for using placeholders is to insure that the loading speed of the first information provider's web page is not negatively affected by the loading speed of the second information. The content served within the placeholder is loaded at the time that the placeholder is rendered. It also allows that placeholder to be controlled, monitored and authenticated by the content provider who is controlling the placeholder. However, the usage of placeholders leads to the second information provider not knowing anything about the first information and/or the first information provider making it impossible to adapt the second information to the first information. As a result, often the second information is not compatible with or able to be affected by the first information. This is not desirable by either information provider.

Thus, it is desirable to provide a method that allows for the second information provider to provide second information that is compatible with the first information.

SUMMARY OF THE INVENTION

This object is achieved by methods according to the independent claims. Advantageous embodiments are subject-matter of the dependent claims.

According to a first aspect of the invention, information is bypassed from the first information provider to the second information provider via an information intermediary.

Advantages of the Invention

The invention makes it possible that the second information provider receives data regarding the first information. Thus, the second information provider has the possibility to choose the second information that is compatible with and/or affected by the first information.

The data regarding the first information can be the complete first information, one or more keywords, one or more categories, an extract of the first information, a summary of the first information, other meta data from the first information etc. As mentioned, the choice of which second information (e.g., an advertisement) is to be placed on the first information provider's web page has to be made by the second information provider in real time. Once a visitor who is interested in the first information visits the first information provider's web page, the second information is loaded from the second information provider. Thus, at this point in time the second information provider has to choose the relevant compatible second information. However, due to limited bandwidth it is usually not possible to transmit the complete first information both to the interested visitors and to the second information provider(s) (especially if numerous second information providers are associated with a chooser). The invention results in that only few additional data, i.e. a unique identifier uniquely associated with the first information and/or a program code for appending the unique identifier to an URL, has to be transmitted by the first information provider essentially not increasing the bandwidth need and transmitting time. Thus, the first information provider can use the available bandwidth essentially to provide the first information to the interested visitors. If the first information is a web page, the unique identifier preferably comprises the URL of the web page.

Further advantages are achieved by the information intermediary transmitting the data to the second information. E.g., the second information provider needs not to rely on data that is transmitted by the first information provider itself. The information intermediary can generate the data regarding the first information by independently analyzing the first information, e.g. the publisher's web page. Thus, a neutral instance representing the analysis derivation is added, which acts as an information intermediary between the first and second information providers increasing e.g. the data reliability, relevancy, comprehensiveness or consistency.

The unique identifier can be generated by the information intermediary or by the first information provider. In the first case, the unique identifier is transmitted to the first information provider and therefrom to the second information provider. In the latter case, the unique identifier is transmitted from the first information provider to the second information provider. In the end, the unique identifier is transmitted from the second information provider to the information intermediary so that the information intermediary can identify the first information and transmit data regarding the first information to the second information provider.

It is preferred, that the unique identifier consists of text or is textual encoded, especially base64 encoded or uuencoded, to be easily transmittable over the Internet. Textual encoding schemes are commonly used when there is a need to encode (e.g. binary) data that need to be stored and transferred over media that are designed to deal with textual data, like http requests. Textual encoding of the unique identifier also allows for easily transmitting encrypted identifiers, e.g. by an AES encryption. An encryption increases the data security to mask the actual content source (eg., page location) of the first information.

If the unique identifier is encrypted with a key that is not known to the second information provider and/or that is only known to the information intermediary, this assures that the data regarding the first information received by the second information provider originate from the (e.g. trusted) information intermediary, increasing the data security and integrity.

If the unique identifier is generated by the information intermediary, a symmetric encryption method can preferably be used so that the unique identifier is before transmittal encrypted by the information intermediary with a key only known to the information intermediary.

If the unique identifier is generated by the first information provider, a combination of a symmetric and an asymmetric encryption method can preferably be used so that the unique identifier is before transmittal encrypted by the first information provider with a first key not known to the second information provider and the first key is encrypted by the first information provider with a public key where the associated private key is only known to the information intermediary. Further, the encrypted unique identifier and the encrypted first key are preferably transmitted via the second information provider to the information intermediary.

The transmittal of the unique identifier from the first information provider to the second information provider is preferably performed by the first information provider inserting program code into his web page, which program code is loaded and run by a visitor's browser. The program code, when being run, fetches and appends the unique identifier in textual form to a target URL of a placeholder for the second information in the browser memory.

Advantageously, the invention also solves the problems mentioned above in connection with social networks. Here, the member is referred to as first information provider with the first information being personal data like name, age, nationality, sex, home, job, hobbies, interest categories, pages the user has visited, etc. The second information provider can be e.g. an advertiser which wants to provide compatible ads (so-called targeted ads) or an associate of the social network operator, which wants to provide information or adapt the behavior of the associate system such that is relevant to the first information provider, e.g. information about his home, country, age group, job, hobbies etc. In this case, a neutral instance can act as an information intermediary between the first and second information providers transmitting only the data regarding the first information that is important to choose the second information. Thus, the size of data to be transmitted can be limited and the data privacy of the first information provider can be increased.

This invention also solves problems with social networks as mentioned above in the additional situation where the associate of the social network operator, which wants to provide information or adapt the behavior of the associate system, may be one or more levels separated from the social network. In this case, relevant information, associated with the first information provider, is protected and maintained with privacy, such that it can be only interpreted by the second information provider for whom the first information is required.

The invention also can be advantageously be used in connection with mobile application providers (such as gaming applications). In this situation, the handset owner is referred to as first information provider with the first information being personal data like name, age, nationality, sex, home location, current location, hobbies, prior game purchases, play time, interest categories, immediate circle of friends in the game, etc. The second information provider can be e.g. an advertiser which wants to provide compatible ads (so-called targeted ads), or an associate of the mobile game software provider which wants to provide this information that is relevant to the first information provider, or an associate of the mobile network operator which wants to provide this information that is relevant to the first information provider, e.g. information about his home, his location, age group, gaming preferences, hobbies, work, etc. In this case as stated above, a neutral instance can act as an information intermediary between the first and second information providers, irrespective of whether the relationship is a direct or indirect one, transmitting only the data regarding the first information that is important to choose the second information or relevant action. Thus, the size of data to be transmitted is greatly limited and the data privacy surrounding the trusted first information provider can be increased.

An inventive computer program comprising program code means is configured to perform all steps of one of the inventive methods, when the computer program is run on a computer or a corresponding processing unit, in particular on an inventive apparatus. Suitable non-transitory machine readable media for providing the computer program are particularly floppy disks, hard disks, flash memory, EEPROMs, CD-ROMs, and DVDs etc. A download of a program on computer networks (Internet, Intranet, etc.) is possible.

Further advantages and embodiments of the invention will become apparent from the description and the appended figures.

It should be noted that the previously mentioned features and the features to be further described in the following are usable not only in the respectively indicated combination, but also in further combinations or taken alone, without departing from the scope of the present invention.

BRIEF DESCRIPTION OF THE DRAWING VIEWS

DETAILED DESCRIPTION OF THE INVENTION

Figure 1:
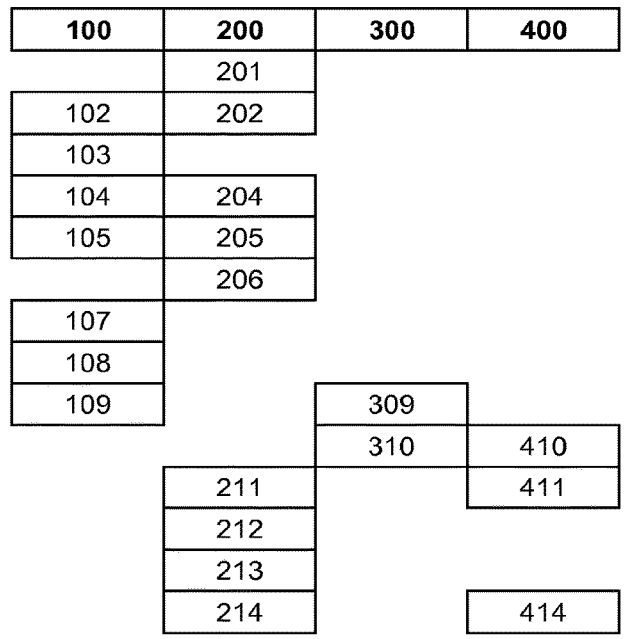
FIG. 1 is a simplified schematic diagram illustrating a preferred embodiment of different steps according to the invention.
Figure 2:
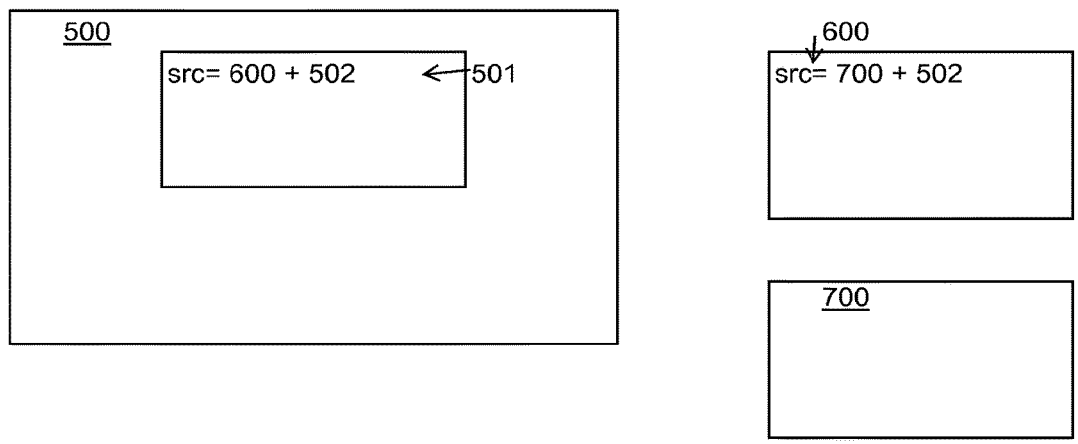
FIG. 2 is a simplified schematic diagram illustrating a preferred embodiment of the invention on a web page level.

The invention is described referring to FIGS. 1 and 2. In FIG. 1, different steps according to one or more inventive methods are illustrated schematically. The steps referred to as 100 are performed by a content publisher as a first information provider. The steps referred to as 200 are performed by an analyzer as an information intermediary. The steps referred to as 300 are performed by an ad-server as a chooser. The steps referred to as 400 are performed by an advertiser as a second information provider. In FIG. 2, a preferred embodiment of the invention is illustrated schematically on a web page level.

Beginning with step 201, the analyzer generates a key set consisting of a private key and a public key for an asymmetric encryption method, e.g. RSA. In step 202, the analyzer 200 transmits the public key to the publisher 100 and the publisher 100 receipts the public key in step 102.

In step 103, the publisher 100 offers content as first information on his web page 500. The publisher 100 defines ad space using an iframe 501 as a placeholder. The source of the iframe 501 is set to a URL 600 belonging to the chooser.

In step 204, the analyzer 200 receives the URL of the web page 500 from the publisher 100. This could be done by the analyzer systematically browsing (crawling) the publisher's web content or by the publisher 100 transmitting relevant URLs to the analyzer in step 104. Preferably, the analyzer 200 provides a database where URLs that are expected to be analyzed are placed, especially in arbitrary groups (e.g., all URLs of one group belong to the same web site). This could be done regularly.

In step 105, the publisher 100 transmits the content of the web page 500 as first information to the analyzer 200. Simultaneously, the analyzer 200 receives the content of the web page 500 as first information, preferably by loading the web page, in step 205. This could be done regularly.

In step 206, the analyzer 200 analyzes the first information to generate data regarding the first information. Then, the data regarding the first information together with the URL are preferably stored into a database of the analyzer 200. This also could be done regularly.

In step 107, an encrypted token is generated for each URL as unique identifier. The encrypted token is generated by the first information provider encrypting data comprising the URL with a first key of a symmetric encryption method, e.g. AES-128 or AES-256. Further, the encrypted token is generated by the first information provider encrypting the first key with the public key of step 101.

A suitable encrypted token is generated by encrypting (using e.g. AES 128 bit symmetric encryption) a "token string" (i.e. text) comprising one or more of the following data:
  random data
  timestamp
  URL
random data: used to make the resulting token different for every generation and for the padding to bring the total data up to block size.
timestamp: character representation of the time the token string is created
URL: originating URL, uniquely identifying the information.
The AES 128 bit key used to encrypt the above "token string" is generated using a standard AES 128 bit key generation library.

Further, the AES 128 bit key is encrypted with the public key of step 101 and added to the encrypted token string. After the encryption the resulting binary data is preferably encoded in URL-safe base64 encoding. Be it noted that on each fixed interval the generated encrypted tokens will be different for the same URL. This is because the timestamp and random data will be different each time. The timestamp is included in the encrypted token so that the encrypted token can expire (i.e., no longer be valid) after a fixed time period.

In step 108, the publisher 100 inserts a specific program code and the encrypted and encoded token 502 into his web page 500. The program code is configured to modify the iframe 501, when the web page is rendered in the visitor's browser. This could be done e.g. by a java script. The program code is preferably provided by the information intermediary 200.

When a visitor visits the web page 500, the web page is rendered in the visitor's browser. The program code adds the encrypted token to the placeholder by appending the encrypted token 502 to the source URL 600 of the iframe 501. When the web page 500 that contains the java script is rendered by a visitor's browser, the java script looks for a matching URL in a JSON file that is also included in the web page. The URL searched for in the JSON file is the URL of the web page. If a match is found, then the java script takes the encrypted token that is associated with the matching URL and appends it to the iframe source 600. It can be intended that step 108 can only be executed, if the chooser 300 and the advertiser 400 both have allowed code originating from the analyzer 200 to append its code. This can be achieved, e.g., through the cross-domain controls.

When the visitor opens the web page, the encrypted token 502 is transmitted to the chooser 300 as part of the URL 600. Thus, in step 109 the encrypted token is transmitted from the publisher to the chooser via the visitor. In step 309, the encrypted token is received by the chooser simultaneously.

The URL 600 of the chooser in turn comprises an iframe, which source 503 is set to an advertiser's 400 banner ad 700 as second information.

In steps 310 and 410, the encrypted token is transmitted from the ad-server and received by the advertiser, e.g. also as appendix to the source URL of the iframe 600.

In steps 411 and 211, the encrypted token is transmitted from the advertiser and received by the analyzer, preferably as a server to server query.

In step 212, the analyzer validates the encrypted token. This validation proceeds as follows:
  Firstly, the encrypted AES 128 bit key is decrypted with the private key of step 101.
  Secondly, the encrypted token is decrypted using the AES 128 bit key, resulting in the token string.
  Thirdly, it is checked, whether the token string has not yet expired by verifying that the timestamp is not older than some configured, acceptable time interval. If verification fails, then the encrypted token is not validated and the procedure ends.

If the token string is valid, then in step 213 the token string's URL is used to get the data regarding the first information from the database of the analyzer 200.

In steps 214 and 414 the data regarding the first information is transmitted from the analyzer and received by the advertiser. Thus, the advertiser receives targeting data associated with that URL to which he is entitled to have access to and which allows to make the secondary information compatible with the first information. In the field of advertisement, this could be contextual targeting data such as categories or keywords related to the page or site, data about the other ad units on the page, data about the flags of unwanted content on the page etc.

While the invention has been described with reference to certain illustrative embodiments, the description of the methods described is not intended to be construed in a limiting sense. Various modifications and combinations of the illustrative embodiments as well as other advantages and embodiments of the invention will be apparent to visitors skilled in the art upon reference to the description and claims.

What is claimed is:

1. A method for transmitting information from a first information provider to a second information provider via an information intermediary, the method comprising:
   receiving, at a first point in time and at the information intermediary, first information from the first information provider;
   generating a plurality of different types of data regarding the first information, wherein the plurality of different types of data regarding the first information are two or more of an extract of the first information, a summary of the first information, one or more keywords, one or more categories, other meta data about or from the first information, and a compression of the first information;
   associating and storing the plurality of different types of data regarding the first information with a unique identifier of the first information;
   receiving, at a second point in time that is after the first point in time and at the information intermediary, a token comprising the unique identifier of the first information and an identifier of the type of data regarding the first information;
   retrieving, based on the unique identifier of the first information and the identifier of the type of data regarding the first information, the data regarding the first information of the type indicated in the token; and
   transmitting, from the information intermediary, at least part of the data regarding the first information of the type indicated in the token to the second information provider.

2. The method of claim 1, wherein the token further comprises a timestamp representing a time that the token was created, and the method further comprises checking that the token has not expired by verifying that the timestamp is before a predetermined time.

3. The method of claim 1, wherein the token is encrypted, and the method further comprises decrypting the encrypted token to determine the unique identifier of the first information.

4. The method of claim 3, wherein the token is encrypted using a key not known to the second information provider.

5. The method of claim 1, wherein the unique identifier of the first information consists of text or is textually encoded.

6. The method of claim 5, wherein the unique identifier of the first information is base64 encoded.

7. The method of claim 5, wherein the unique identifier of the first information is unencoded.

8. The method of claim 1, wherein the token further comprises a signature based on other data included in the token.

9. The method of claim 1, wherein the token further comprises a version indicator of the token.

10. A method for transmitting information from a first information provider to a second information provider via an information intermediary, the method comprising:
    transmitting, from the first information provider, first information to the information intermediary;
    generating a token comprising an identifier of a type of data and a unique identifier of the first information to identify one or more of a plurality of different types of data regarding the first information generated by the information intermediary, wherein the plurality of different types of data regarding the first information are two or more of an extract of the first information, a summary of the first information, one or more keywords, one or more categories, other meta data about or from the first information, and a compression of the first information; and
    transmitting, from the first information provider, the token to the second information provider, the token then being transmitted from the second information provider to the information intermediary to identify the data regarding the first information of the type indicated in the token.

11. The method of claim 10, further comprising encrypting the token comprising the identifier of the type of data and the unique identifier of the first information using a first key received from the information intermediary.

12. The method of claim 10, wherein transmitting the token to the second information provider comprises including a corresponding program code into a web page, the program code modifying a placeholder for a second information.

13. The method of claim 10, wherein transmitting the token to the second information provider comprises transmitting the token to the second information provider when a visitor views the first information.

14. The method of claim 10, wherein transmitting the token to the second information provider comprises appending the token in textual form to a target URL of a placeholder for a second information.

15. The method of claim 10, wherein transmitting the token to the second information provider comprises forwarding, from the first information provider, the token to an ad server that forwards the token to the second information provider.

16. The method of claim 10, wherein the token further comprises a signature based on other data included in the token.

17. The method of claim 10, wherein the token further comprises a version indicator of the token.

18. A method for transmitting information from a first information provider to a second information provider via an information intermediary, the method comprising:
    receiving, at the second information provider, a token via the first information provider, the token comprising an identifier of a type of data and a unique identifier of first information to identify one or more of a plurality of different types of data regarding the first information that is generated by the information intermediary, wherein the plurality of different types of data regarding the first information are two or more of an extract of the first information, a summary of the first information, one or more keywords, one or more categories, other meta data about or from the first information, and a compression of the first information;
    transmitting the token to the information intermediary; and
    receiving, at the second information provider, at least part of the data regarding the first information of the type indicated in the token from the information intermediary.

19. The method of claim 18, wherein the token further comprises a signature based on other data included in the token or a version indicator of the token.

20. The method of claim 18, wherein the token is encrypted using a key not known to the second information provider.

* * * * *